US 010926996B2

United States Patent
Shock

(10) Patent No.: US 10,926,996 B2
(45) Date of Patent: Feb. 23, 2021

(54) MOBILE DISTRIBUTION STATION HAVING ADJUSTABLE FEED NETWORK

(71) Applicant: Fuel Automation Station, LLC, Birmingham, MI (US)

(72) Inventor: Ricky Dean Shock, Victoria, TX (US)

(73) Assignee: FUEL AUTOMATION STATION, LLC., Birmingham, MI (US)

( * ) Notice: Subject to any disclaimer, the term of this patent is extended or adjusted under 35 U.S.C. 154(b) by 188 days.

(21) Appl. No.: 15/970,926

(22) Filed: May 4, 2018

(65) Prior Publication Data
US 2019/0337795 A1 Nov. 7, 2019

(51) Int. Cl.
| | |
|---|---|
| B67D 7/22 | (2010.01) |
| B67D 7/38 | (2010.01) |
| B67D 7/62 | (2010.01) |
| B67D 7/70 | (2010.01) |
| B67D 7/84 | (2010.01) |
| G05D 7/06 | (2006.01) |
| B67D 7/40 | (2010.01) |

(Continued)

(52) U.S. Cl.
CPC .................. *B67D 7/22* (2013.01); *B67D 7/38* (2013.01); *B67D 7/40* (2013.01); *B67D 7/62* (2013.01); *B67D 7/70* (2013.01); *B67D 7/78* (2013.01); *B67D 7/845* (2013.01); *G05D 7/0664* (2013.01); *G05D 7/0682* (2013.01); *E21B 43/26* (2013.01)

(58) Field of Classification Search
None
See application file for complete search history.

(56) References Cited

U.S. PATENT DOCUMENTS

| | | |
|---|---|---|
| 2,340,070 A | 1/1944 | McCauley et al. |
| 2,516,150 A | 7/1950 | Samiran |
| 2,769,572 A | 11/1956 | Harman et al. |

(Continued)

FOREIGN PATENT DOCUMENTS

| | | |
|---|---|---|
| DE | 1147397 | 4/1963 |
| DE | 20106400 | 10/2001 |

(Continued)

OTHER PUBLICATIONS

Oilfield Business: Technologies. Frac Shack Inc. introduces world's first Bi-Fuel Distribution Unit for hydraulic fracturing industry. Texas Oil & Gas: The National Magazine for Oil & Gas in Texas. vol. 4, Issue 2. 2015. p. 27.

(Continued)

*Primary Examiner* — Daphne M Barry
(74) *Attorney, Agent, or Firm* — Carlson, Gaskey & Olds, P.C.

(57) ABSTRACT

A distribution station includes an adjustable feed network that connects first and second pumps with first and second manifolds. The network is switchable between first and second configurations. In the first configuration a first pump is fluidly connected with the first manifold and fluidly disconnected from the second manifold. Concurrently, the second pump is fluidly connected to the second manifold and is fluidly disconnected from the first manifold. In the second configuration the first pump is fluidly connected with the second manifold and fluidly disconnected from the first manifold, and the second pump is fluidly disconnected from the first and second manifolds.

6 Claims, 3 Drawing Sheets

(51) Int. Cl.
*B67D 7/78* (2010.01)
*E21B 43/26* (2006.01)

(56) References Cited

U.S. PATENT DOCUMENTS

| | | | |
|---|---|---|---|
| 2,777,461 | A | 1/1957 | Wildhaber |
| 2,966,921 | A | 1/1961 | Whiteman |
| 3,028,010 | A | 4/1962 | Headrick |
| 3,136,295 | A | 6/1964 | Gramo |
| 3,547,141 | A | 12/1970 | Alexander |
| 3,605,798 | A | 9/1971 | Green et al. |
| 3,618,643 | A | 11/1971 | Thomson |
| 3,625,399 | A | 12/1971 | Heisler |
| 3,656,134 | A | 4/1972 | Brown |
| 3,677,284 | A | 7/1972 | Mendez |
| 3,720,226 | A * | 3/1973 | Minich, Jr. ............. B60P 3/14 137/334 |
| 3,881,509 | A | 5/1975 | Newton |
| 4,139,019 | A | 2/1979 | Bresie et al. |
| 4,284,210 | A | 8/1981 | Horak |
| 4,511,311 | A | 4/1985 | Olson |
| 4,591,115 | A | 5/1986 | DeCarlo |
| 4,651,788 | A | 3/1987 | Grosskreuz et al. |
| 4,728,005 | A | 3/1988 | Jacobs et al. |
| 4,930,665 | A | 6/1990 | Devine |
| 5,406,988 | A | 4/1995 | Hopkins |
| 5,454,408 | A | 10/1995 | DiBella et al. |
| 5,465,766 | A | 11/1995 | Siegele et al. |
| 5,503,199 | A | 4/1996 | Whitley, II et al. |
| 5,538,051 | A | 7/1996 | Brown et al. |
| 5,551,309 | A | 9/1996 | Goossens et al. |
| 5,651,400 | A | 7/1997 | Corts et al. |
| 5,660,358 | A | 8/1997 | Grafwallner et al. |
| 5,708,424 | A | 1/1998 | Orlando et al. |
| 5,749,339 | A | 5/1998 | Graham et al. |
| 5,887,567 | A | 3/1999 | White et al. |
| 5,927,603 | A | 7/1999 | McNabb |
| 5,884,675 | A | 12/1999 | Krasnov |
| 6,098,646 | A | 8/2000 | Hennemann et al. |
| 6,206,056 | B1 | 3/2001 | Lagache |
| 6,564,615 | B1 | 5/2003 | Carter |
| 6,601,000 | B1 | 7/2003 | Barlian et al. |
| 6,651,706 | B2 | 11/2003 | Litt |
| 6,697,705 | B2 | 2/2004 | Johnson et al. |
| 6,745,801 | B1 | 6/2004 | Cohen et al. |
| 6,755,225 | B1 | 6/2004 | Niedwiecki et al. |
| 6,761,194 | B1 | 7/2004 | Blong |
| 6,779,569 | B1 | 8/2004 | Teer, Jr. et al. |
| 6,786,245 | B1 | 9/2004 | Eichelberger et al. |
| 6,867,729 | B2 | 3/2005 | Berry et al. |
| 7,063,276 | B2 | 6/2006 | Newton |
| 7,106,026 | B2 | 9/2006 | Moore |
| 7,353,808 | B2 | 4/2008 | Kakoo |
| 7,401,511 | B2 | 7/2008 | Dietmeier |
| 7,415,995 | B2 | 8/2008 | Plummer et al. |
| 7,458,543 | B2 | 12/2008 | Cutler et al. |
| 7,568,507 | B2 | 8/2009 | Farese et al. |
| 7,610,806 | B2 | 11/2009 | Skinner |
| 7,602,143 | B2 | 12/2009 | Capizzo |
| 7,628,182 | B2 | 12/2009 | Poulter |
| 7,937,215 | B2 | 5/2011 | Humphrey |
| 7,938,151 | B2 | 5/2011 | Hockner |
| 3,055,526 | A1 | 11/2011 | Blagg |
| 8,069,885 | B2 | 12/2011 | Kederer et al. |
| 8,448,750 | B2 | 5/2013 | Gaugush et al. |
| 8,959,998 | B2 | 2/2015 | Birtcher et al. |
| 9,346,662 | B2 | 5/2016 | Van Vliet et al. |
| 9,371,830 | B2 | 6/2016 | Moffitt, Jr. |
| 9,371,831 | B2 | 6/2016 | Moffitt, Jr. |
| 9,434,598 | B2 | 9/2016 | Pick et al. |
| 9,586,805 | B1 * | 3/2017 | Shock ............... B67D 7/40 |
| 9,725,295 | B2 | 8/2017 | McKay et al. |
| 2001/0017815 | A1 | 8/2001 | Ackermann et al. |
| 2004/0007286 | A1 * | 1/2004 | Kamikozuru ......... B60P 3/2245 141/231 |
| 2004/0163731 | A1 | 8/2004 | Eichelberger et al. |
| 2004/0187950 | A1 | 9/2004 | Cohen et al. |
| 2005/0109561 | A1 | 5/2005 | Chopra |
| 2007/0079891 | A1 | 4/2007 | Farese et al. |
| 2007/0164031 | A1 | 7/2007 | Holz |
| 2007/0181212 | A1 | 8/2007 | Fell |
| 2008/0078244 | A1 | 4/2008 | Dietmeier |
| 2009/0314384 | A1 | 12/2009 | Braketield et al. |
| 2010/0018605 | A1 | 1/2010 | Bentivoglio |
| 2011/0197988 | A1 | 8/2011 | Van Vliet et al. |
| 2016/0076533 | A1 | 3/2016 | Moffitt, Jr. |

FOREIGN PATENT DOCUMENTS

| | | |
|---|---|---|
| DE | 10309307 | 9/2004 |
| DE | 102006025025 | 12/2006 |
| DE | 102006038652 | 2/2008 |
| EP | 0161042 | 11/1985 |
| EP | 0433041 | 6/2001 |
| GB | 2485832 | 5/2012 |
| JP | 1992062289 | 2/1992 |
| JP | 2003002400 | 1/2003 |
| JP | 2007182242 | 7/2007 |
| JP | 2008265843 | 11/2008 |
| RU | 28347 | 3/2003 |
| RU | 91135 | 1/2010 |
| RU | 2452668 | 1/2012 |
| SU | 949644 | 8/1982 |
| WO | 0177006 | 10/2001 |
| WO | 03029721 | 4/2003 |
| WO | 03093118 | 11/2003 |
| WO | 2006005686 | 1/2006 |
| WO | 2006116572 | 11/2006 |
| WO | 2007087849 | 8/2007 |
| WO | 2008083830 | 7/2008 |
| WO | 2009026607 | 3/2009 |
| WO | 20090608065 | 6/2009 |

OTHER PUBLICATIONS

Frac Shack International. Publications & Endorsements. Retrieved Aug. 23, 2016 from: http://www.fracshack.com.
Frac Shack International. Technology. Retrieved Aug. 23, 2016 from: http://www.fracshack.com.
Frac Shack International. Design Benefits. Retrieved Aug. 23, 2016 from: http://www.fracshack.com.
Frac Shack International. Frac Shack Series—Series A. Retrieved Aug. 23, 2016 from: http://www.fracshack.com.
Frac Shack International. Frac Shack Series—Series B. Retrieved Aug. 23, 2016 from: http://www.fracshack.com.
Frac Shack International. Frac Shack Series—Series C. Retrieved Aug. 23, 2016 from: http://www.fracshack.com.
Frac Shack International. Frac Shack Series—Series D. Retrieved Aug. 23, 2016 from: http://www.fracshack.com.
Frac Shack International. Frac Shack Series—Series E. Retrieved Aug. 23, 2016 from: http://www.fracshack.com.
Frac Shack International. Frac Shack Series—Series EG. Retrieved Aug. 23, 2016 from: http://www.fracshack.com.
Mann Tek. Dry Disconnect Couplings. Retrieved Jul. 22, 2016 from: http://www.manntek.com/products/drydisconnectcouplings p. 1-4.
Mann Tek. Dry Aviation Couplings. Retrieved Jul. 22, 2016 from: http://www.manntek.com/products/dryaviationcouplings p. 1-4.
Waterman, J. (2013). Better Safe than Sorry: Frac Shack a welcome addition to the oil patch. Jan. 2, 2013. Retrieved Aug. 23, 2016 from: http://www.pipelinenewsnorth.ca/better-safe-than-sorry-1.1123066.
U.S. Appl. No. 15/655,115, filed Jul. 20, 2017.
U.S. Appl. No. 15/782,335, filed Oct. 12, 2017.
U.S. Appl. No. 15/673,730, filed Aug. 10, 2017.
U.S. Appl. No. 15/673,796, filed Aug. 10, 2017.
U.S. Appl. No. 15/416,198, filed Jan. 26, 2017.
U.S. Appl. No. 15/703,285, filed Sep. 13, 2017.
Shimazaki, H. (1986). Development of centralized fueling and management system of kerosene heating machine. Nisseki Technical Review, vol. 28(4). Jul. 1986. pp. 184-188.

(56) References Cited

OTHER PUBLICATIONS

Technical Document. Surface vehicle standard. SAE International. Sep. 2014. pp. 1-5.
Frac Shack International. Safety. Retrieved Aug. 23, 2016 from: http://www.fracshack.com.
Frac Shack International. Service. Retrieved Aug. 23, 2016 from: http://www.fracshack.com.

* cited by examiner

MOBILE DISTRIBUTION STATION HAVING ADJUSTABLE FEED NETWORK

BACKGROUND

Hydraulic fracturing (also known as fracking) is a well-stimulation process that utilizes pressurized liquids to fracture rock formations. Pumps and other equipment used for hydraulic fracturing typically operate at the surface of the well site. The equipment may operate until refueling is needed, at which time the equipment may be shut-down for refueling. Shut-downs are costly and reduce efficiency. More preferably, to avoid shut-downs fuel is replenished in a hot-refueling operation while the equipment continues to run. This permits fracking operations to proceed continuously. However, hot-refueling can be difficult to reliably sustain for the duration of the fracking operation.

SUMMARY

A distribution station according to an example of the present disclosure includes a mobile trailer, first and second manifolds on the mobile trailer, first and second pumps on the mobile trailer, and an adjustable feed network connecting the first and second pumps with the first and second manifolds. The adjustable feed network is switchable between first and second configurations. In the first configuration the first pump is fluidly connected with the first manifold and fluidly disconnected from the second manifold, and concurrently the second pump is fluidly connected to the second manifold and is fluidly disconnected from the first manifold. In the second configuration the first pump is fluidly connected with the second manifold and fluidly disconnected from the first manifold, and the second pump is fluidly disconnected from the first and second manifolds. A plurality of reels on the mobile trailer are individually connected with the first or second manifold. A plurality of hoses are connected with a different one of the reels. A plurality of valves on the mobile trailer are situated between the first or second manifold and a respective different one of the reels. A plurality of fluid level sensors are fluid level sensor connectable to an end of a different one of the hoses. A controller is configured to individually open and close the valves responsive to the fluid level sensors.

A distribution station according to an example of the present disclosure includes a mobile trailer, first and second manifolds on the mobile trailer, first and second pumps on the mobile trailer, and a network of fluid lines and valves connecting the first and second pumps with the first and second manifolds. The valves are adjustable to change fluid flow paths through the network such that each of the first and second pumps can be fluidly connected with each of the first and second manifolds. A plurality of reels on the mobile trailer are individually connected with the first or second manifold. A plurality of hoses are connected with a different one of the reels. A plurality of valves on the mobile trailer are situated between the first or second manifold and a respective different one of the reels. A plurality of fluid level sensors are connectable to an end of a different one of the hoses. A controller is configured to individually open and close the valves responsive to the fluid level sensors.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
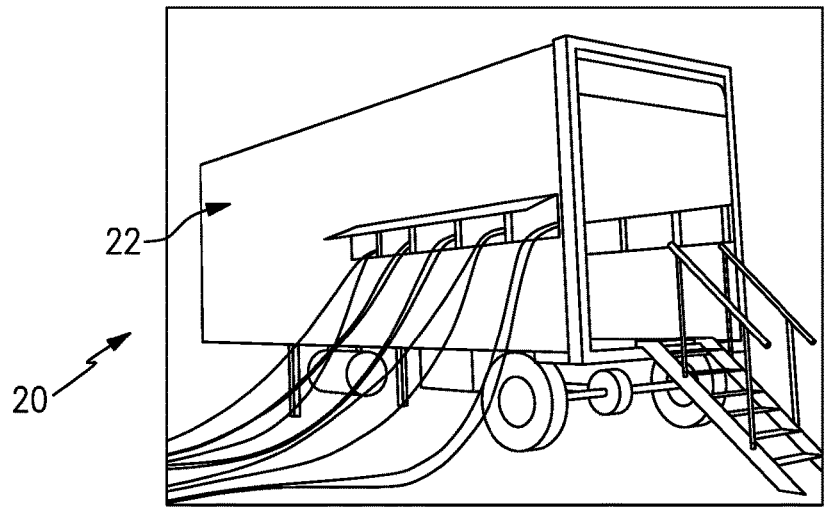
FIG. 1 illustrates an example mobile distribution station.
Figure 2:
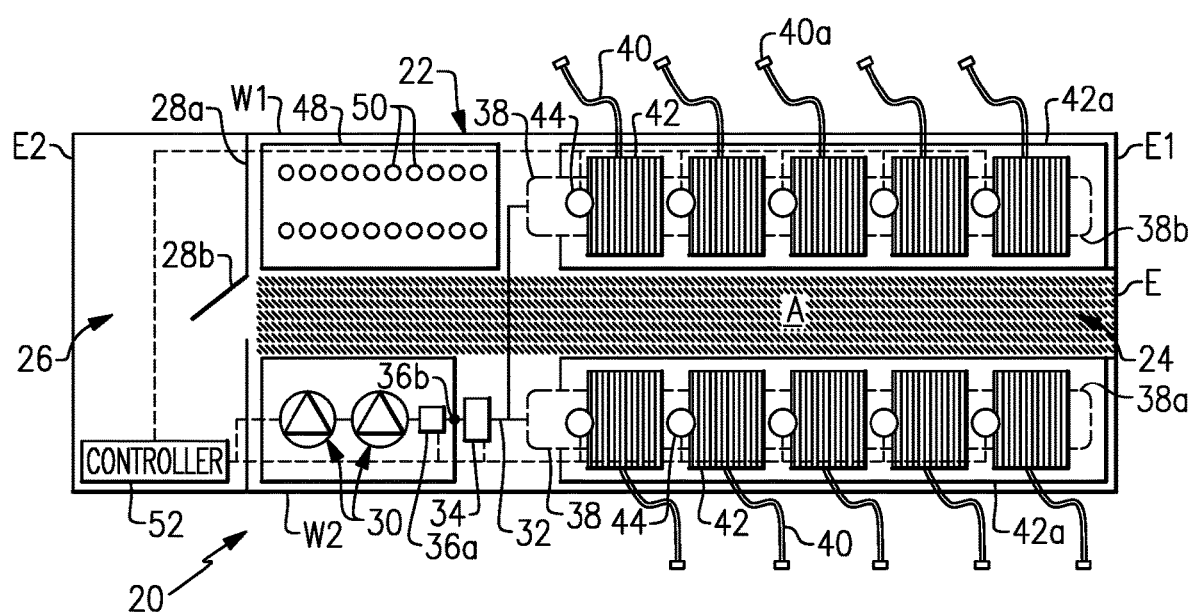
FIG. 2 illustrates an internal layout of a mobile distribution station.

FIG. 1 illustrates a mobile distribution station 20 and FIG. 2 illustrates an internal layout of the station 20. As will be described, the station 20 may serve in a "hot-refueling" capacity to distribute fuel to multiple pieces of equipment while the equipment is running, such as fracking equipment at a well site. As will be appreciated, the station 20 is not limited to applications for fracking or for delivering fuel. The examples herein may be presented with respect to fuel delivery, but the station 20 may be used in mobile delivery of other fluids, in other gas/petroleum recovery operations, or in other operations where mobile refueling or fluid delivery will be of benefit.

In this example, the station 20 includes a mobile trailer 22. Generally, the mobile trailer 22 is elongated and has first and second opposed trailer side walls W1 and W2 that join first and second opposed trailer end walls E1 and E2. Most typically, the trailer 22 will also have a closed top (not shown). The mobile trailer 22 may have wheels that permit the mobile trailer 22 to be moved by a vehicle from site to site to service different hot-refueling operations. In this example, the mobile trailer 22 has two compartments. A first compartment 24 includes the physical components for distributing fuel, such as diesel fuel, and a second compartment 26 serves as an isolated control room for managing and monitoring fuel distribution. The compartments 24/26 are separated by an inside wall 28a that has an inside door 28b.

The first compartment 24 includes one or more pumps 30. Fuel may be provided to the one or more pumps 30 from an external fuel source, such as a tanker truck on the site. On the trailer 22, the one or more pumps 30 are fluidly connected via a fuel line 32 with one or more high precision registers 34 for metering fuel. The fuel line 32 may include, but is not limited to, hard piping. In this example, the fuel line 32 includes a filtration and air eliminator system 36a and one or more sensors 36b. Although optional, the system 36a is beneficial in many implementations, to remove foreign particles and air from the fuel prior to delivery to the equipment. The one or more sensors 36b may include a temperature sensor, a pressure sensor, or a combination thereof, which assist in fuel distribution management.

The fuel line 32 is connected with one or more manifolds 38. In the illustrated example, the station 20 includes two manifolds 38, represented at 38a and 38b, that arranged on opposed sides of the compartment 24. As an example, the manifolds 38 are elongated tubes that are generally larger in diameter than the fuel line 32 and that have at least one inlet and multiple outlets. Each hose 40 is wound, at least initially, on a reel 42 that is rotatable to extend or retract the hose 40 externally through one or more windows of the trailer 22. Each reel 42 may have an associated motor to mechanically extend and retract the hose 40.

Figure 3:
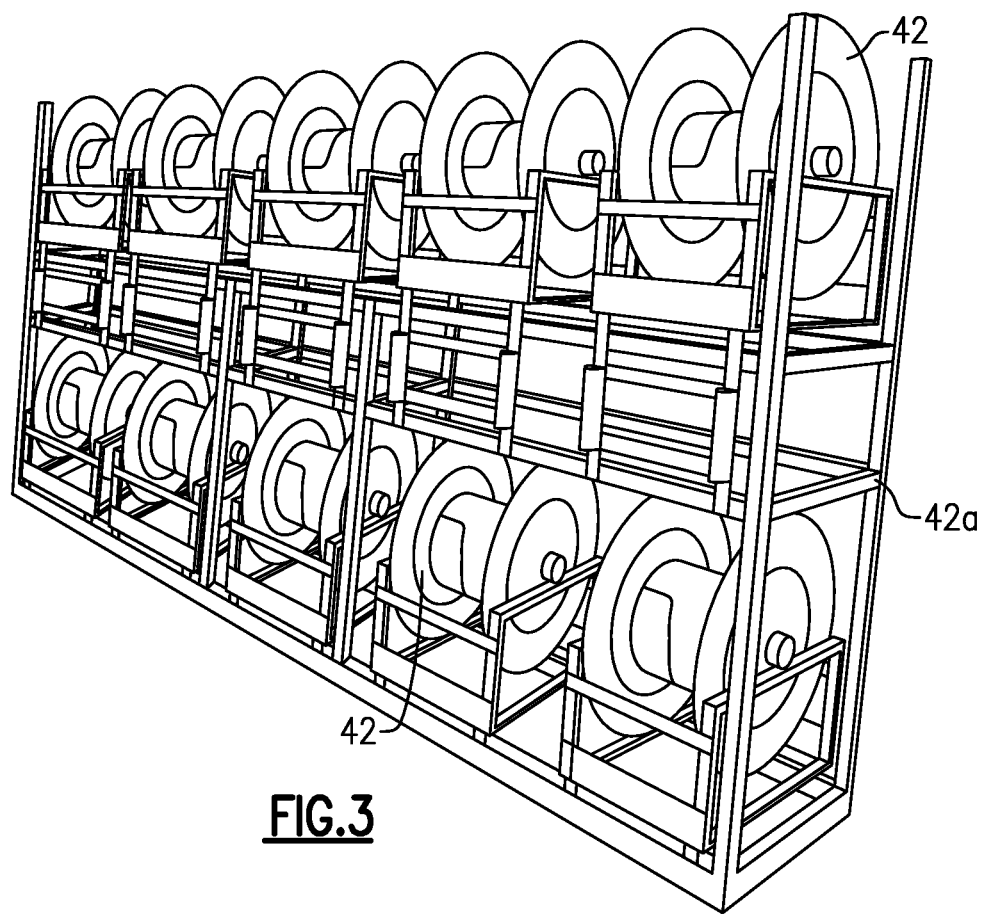
FIG. 3 illustrates an isolated view of hose reels on a support rack used in a mobile distribution station.

As shown in an isolated view in FIG. 3, the reels 42 are mounted on a support rack 42a. In this example, the support rack 42a is configured with upper and lower rows of reels 42. Each row has five reels 42 such that each support rack 42a provides ten reels 42 and thus ten hoses 40. There are two support racks 42a (FIG. 2) arranged on opposed sides of the first compartment 24, with an aisle (A) that runs between the support racks 42a from an outside door E to the inside door 28b. The station 20 therefore provides twenty hoses 40 in the illustrated arrangement, with ten hoses 40 provided on each side of the station 20. As will be appreciated, fewer or additional reels and hoses may be used in alternative examples.

Figure 4:
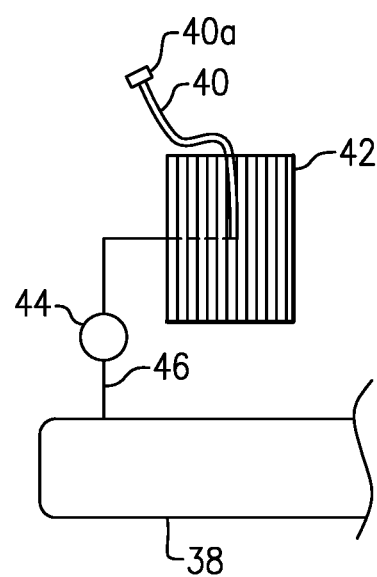
FIG. 4 illustrates an example of a connection between a manifold, a control valve, and a reel.

As shown in a representative example in FIG. 4, each hose 40 is connected to a respective one of the reels 42 and a respective one of a plurality of control valves 44. For example, a secondary fuel line 46 leads from the manifold 38 to the reel 42. The control valve 44 is in the secondary fuel line 46. The control valve 44 is moveable between open and closed positions to selectively permit fuel flow from the manifold 38 to the reel 42 and the hose 40. For example, the control valve 44 is a powered valve, such as a solenoid valve.

In the illustrated example, the first compartment 24 also includes a sensor support rack 48. The sensor support rack 48 holds integrated fuel cap sensors 50 (when not in use), or at least portions thereof. When in use, each integrated fuel cap sensor 50 is temporarily affixed to a piece of equipment (i.e., the fuel tank of the equipment) that is subject to the hot-refueling operation. Each hose 40 may include a connector end 40a and each integrated fuel cap sensor 50 may have a corresponding mating connector to facilitate rapid connection and disconnection of the hose 40 with the integrated fuel cap sensor 50. For example, the connector end 40a and mating connector on the integrated fuel cap sensor 50 form a hydraulic quick-connect.

At least the control valves 44, pump or pumps 30, sensor or sensors 36b, and register 34 are in communication with a controller 52 located in the second compartment 26. As an example, the controller 52 includes software, hardware, or both that is configured to carry out any of the functions described herein. In one further example, the controller 52 includes a programmable logic controller with a touch-screen for user input and display of status data. For example, the screen may simultaneously show multiple fluid levels of the equipment that is being serviced.

When in operation, the integrated fuel cap sensors 50 are mounted on respective fuel tanks of the pieces of equipment that are subject to the hot-refueling operation. The hoses 40 are connected to the respective integrated fuel cap sensors 50. Each integrated fuel cap sensor 50 generates signals that are indicative of the fuel level in the fuel tank of the piece of equipment on which the integrated fuel cap sensor 50 is mounted. The signals are communicated to the controller 52.

The controller 52 interprets the signals and determines the fuel level for each fuel tank of each piece of equipment. In response to a fuel level that falls below a lower threshold, the controller 52 opens the control valve 44 associated with the hose 40 to that fuel tank and activates the pump or pumps 30. The pump or pumps 30 provide fuel flow into the manifolds 38 and through the open control valve 44 and reel 42 such that fuel is provided through the respective hose 40 and integrated fuel cap sensor 50 into the fuel tank. The lower threshold may correspond to an empty fuel level of the fuel tank, but more typically the lower threshold will be a level above the empty level to reduce the potential that the equipment completely runs out of fuel and shuts down.

The controller 52 also determines when the fuel level in the fuel tank reaches an upper threshold. The upper threshold may correspond to a full fuel level of the fuel tank, but more typically the upper threshold will be a level below the full level to reduce the potential for overflow. In response to reaching the upper threshold, the controller 52 closes the respective control valve 44 and ceases the pump or pumps 30. If other control valves 44 are open or are to be opened, the pump or pumps 30 may remain on. The controller 52 can also be programmed with an electronic stop failsafe measure to prevent over-filling. As an example, once an upper threshold is reached on a first tank and the control valve 44 is closed, but the pump 30 is otherwise to remain on to fill other tanks, if the fuel level continues to rise in the first tank, the controller 52 shuts the pump 30 off.

Multiple control valves 44 may be open at one time, to provide fuel to multiple fuel tanks at one time. Alternatively, if there is demand for fuel from two or more fuel tanks, the controller 52 may sequentially open the control valves 44 such that the tanks are refueled sequentially. For instance, upon completion of refueling of one fuel tank, the controller 52 closes the control valve 44 of the hose 40 associated with that tank and then opens the next control valve 44 to begin refueling the next fuel tank. Sequential refueling may facilitate maintaining internal pressure in the manifold and fuel line 32 above a desired or preset pressure threshold to more rapidly deliver fuel. Similarly, the controller 52 may limit the number of control valves 44 that are open at any one instance in order to maintain the internal pressure in the manifold and fuel line 32 above a desired or preset threshold. The controller 52 may perform the functions above while in an automated operating mode. Additionally, the controller 52 may have a manual mode in which a user can control at least some functions through the PLC, such as starting and stopped the pump 30 and opening and closing control valves 44. For example, manual mode may be used at the beginning of a job when initially filling tanks to levels at which the fuel cap sensors 50 can detect fuel and/or during a job if a fuel cap sensor 50 becomes inoperable. Of course, operating in manual mode may deactivate some automated functions, such as filling at the low threshold or stopping at the high threshold.

In addition to the use of the sensor signals to determine fuel level, or even as an alternative to use of the sensor signals, the refueling may be time-based. For instance, the fuel consumption of a given piece of equipment may be known such that the fuel tank reaches the lower threshold at known time intervals. The controller 52 is operable to refuel the fuel tank at the time intervals rather than on the basis of the sensor signals, although sensor signals may also be used to verify fuel level.

The controller 52 also tracks the amount of fuel provided to the fuel tanks. For instance, the register 34 precisely measures the amount of fuel provided from the pump or pumps 30. As an example, the register 34 is an electronic register and has a resolution of about 0.1 gallons. The register 34 communicates measurement data to the controller 52. The controller 52 can thus determine the total amount of fuel used to very precise levels. The controller 52 may also be configured to provide outputs of the total amount of fuel consumed. For instance, a user may program the controller 52 to provide outputs at desired intervals, such as by worker shifts or daily, weekly, or monthly periods. The outputs may also be used to generate invoices for the amount of fuel used. As an example, the controller 52 may provide a daily output of fuel use and trigger the generation of an invoice that corresponds to the daily fuel use, thereby enabling almost instantaneous invoicing.

In a further example, the integrated fuel cap sensors 50 are each hard-wired to the controller 52. The term "hard-wired" or variations thereof refers to a wired connection between two components that serves for electronic communication there between, which here is a sensor and a controller. The hard-wiring may facilitate providing more reliable signals from the integrated fuel cap sensors 50. For instance, the many pieces of equipment, vehicles, workers, etc. at a site may communicate using wireless devices. The wireless signals may interfere with each other and, therefore, degrade communication reliability. Hard-wiring the integrated fuel cap sensors 50 to the controller 52 facilitates reduction in interference and thus enhances reliability.

In some instances, it may be desirable to concurrently deliver two different fluids using the station 20. For example, the station 20 can be configured to deliver different types of fuels, such as but not limited to clear and dyed diesel fuels. In this regard, the station 20 can include two pumps 30 and two registers 34. Each pump 30 is fluidly connected with a corresponding one of the registers 34, i.e., a pump/register set. The pump/register sets can be connected in parallel to concurrently deliver different fuels to the respective manifolds 38a/38b.

With a purely parallel arrangement of pump/register sets, the pump/register sets and manifolds are fluidly isolated from each other. Therefore, there is no chance that the fuels will be mixed. However, there is also no ability to use the pump or register of one pump/register set with the other pump/register set. Thus, in the event that a pump or register malfunctions, becomes inoperable, or is shut down for some reason, the ability to deliver the corresponding fuel is lost.

Figure 5:
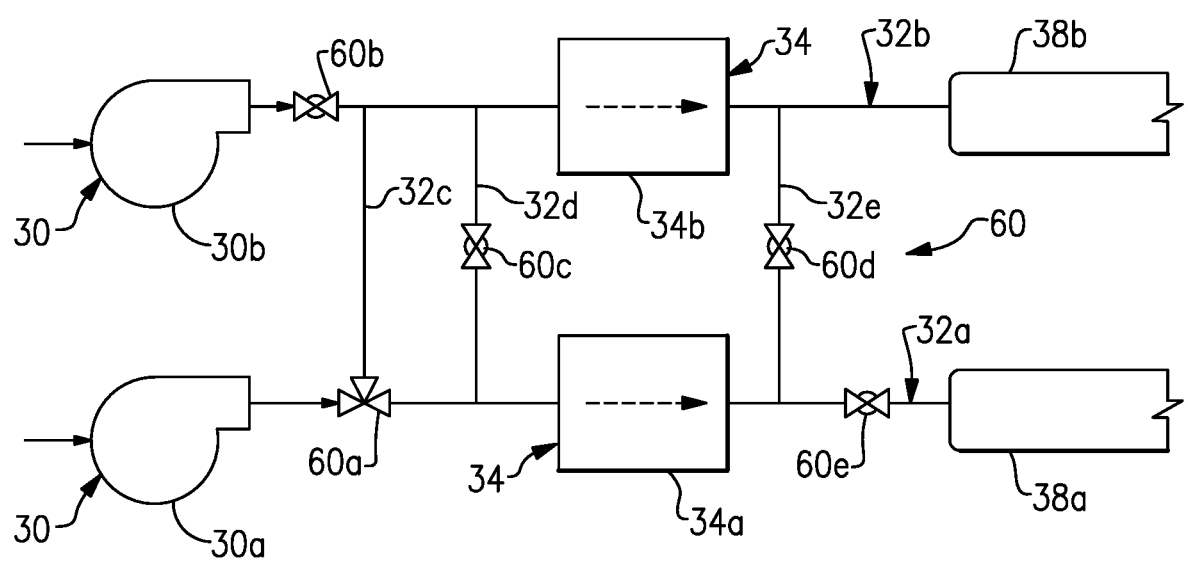
FIG. 5 illustrates an example of an adjustable feed network of a mobile distribution station.

FIG. 5 illustrates an adjustable feed network 60 ("network 60) that can be used in the station 20 to provide flexibility among use of the pumps 30 and registers 34. In this example, there are two pumps 30 (first pump 30a and second pump 30b) and two registers (first register 34a and second register 34b) that are connected by the network 60. The network 60 generally includes lines (e.g., pipes) and valves that interconnect the pumps 30, registers 34, and manifolds 38. In this example, the network 60 includes first and second lines 32a/32b that connect the first and second pumps 30a/30b to, respectively, the first and second manifolds 38a/38b. The network 60 further includes crossover lines 32c/32d/32e that connect the first and second lines 32a/32b, and a series of valves 60a/60b/60c/60d/60e for changing fluid flow paths through the network 60.

The valves 60a/60b/60c/60d/60e can be manual valves, such as but not limited to ball valves, powered valves, such as but not limited to solenoid valves, or a combination of manual and powered valves. The powered valves may be in communication with the controller 52. In implementations in which the adjustability of the network 60 is mainly as a failsafe, the valves 60a/60b/60c/60d/60e may not be used often and manual valves may be sufficient. In other implementations where the adjustability is more often utilized, powered valves may be used for convenience and/or to permit automated operation.

In the illustrated example, the valve 60a is located at the intersection of lines 32c and 32a. The valve 60b is located in line 32b, on the pump side of the intersection of lines 32b and 32c. The valve 60c is located in line 32d, and the valve 60d is located in line 32e. The valve 60e is located in line 32a, to the manifold side of the intersection of lines 32a and 32e.

The valve 60a can be a 2-way valve. For instance, the 2-way valve has three positions. In Position 1 the valve 60a blocks flow from the first pump 30a in line 32a to the line 32c and permits flow from the first pump 30a to continue down the line 32a. In Position 2 the valve 60a permits flow from the first pump 30a in line 32a to the line 32c and blocks flow from the first pump 30a from continuing down the line 32a. In a third, Neutral Position the valve 60a permits flow from line 32c into line 32a toward the first register but blocks flow to the first pump 30a. The remaining valves 60b/60c/60d/60e can be open/close valves, such as ball valves. The first and second registers 34a/34b can also serve as check valves in that they permit flow in only one direction (represented by dashed arrows depicted inside the registers 34a/34b).

The network 60, via the valves and lines, is adjustable or switchable between at least first and second configurations. Each different configuration represents a different fluid flow path through the network 60. FIG. 5 shows one example arrangement of the valves and lines. As will be appreciated given this disclosure, there may be other arrangements that achieve the same function as the disclosed configurations. A summary of configurations of the valves 60a/60b/60c/60d/60e is shown below in Table 1 and discussed further below.

TABLE 1

Adjustable Feed Network Configurations

| | | Valve Position | | | | |
|---|---|---|---|---|---|---|
| Configuration | Description | 60a | 60b | 60c | 60d | 60e |
| 1 | Concurrent flow Pump 30a-Register 34a-Manifold 38a Pump 30b-Register 34b-Manifold 38b | pos. 1 | open | closed | closed | open |
| 2A | Pump 30a-Register 34a-Manifold 38b | pos. 1 | closed | closed | open | closed |
| 2B | Pump 30a-Register 34b-Manifold 38b | pos. 2 | closed | closed | closed | closed |
| 3 | Pump 30b-Register 34a-Manifold 38a | neutral | open | closed | closed | open |

In Configuration 1 the first and second pumps 30a/30b can concurrently provide fluids to, respectively, the first and second registers 34a/34b and the first and second manifolds 38a/38b. That is, there is a first fluid connection via pump 30a/register 34a/manifold 38a and a second, isolated fluid connection via pump 30b/register 34b/manifold 38b. Thus, in the first configuration, the first pump 30a is fluidly connected with the first register 34a and the first manifold 38a and fluidly disconnected from the second register 34b and the second manifold 38b. Concurrently, the second pump 30b is fluidly connected to the second register 34b and the second manifold 38b and is fluidly disconnected from the first register 34a and the first manifold 38a. As will be appreciated, one variation of such an arrangement may exclude the registers 34a/34b (and thus also either line 32d/valve 60c or line 32e/valve 60d).

In a second configuration the first pump 30a is fluidly connected with either the first register 34a (Configuration 2A) or the second register 34b (Configuration 2B) and with the second manifold, and is fluidly disconnected from the first manifold 38a. The second pump 30b is fluidly disconnected from both the first and second manifolds 38a/38b.

In Configuration 3 the second pump 30b is fluidly connected with the first register 34a and the first manifold 38a, and fluidly disconnected from the second register 34b and the second manifold 38b. The first pump 30a is fluidly disconnected from the first and second manifolds 38a/38b and the first and second registers 34a/34b.

The example configuration permits flexibility in operating the station 20. If one of the pumps 30a/30b becomes inoperable, at least temporarily the other of the pumps 30a/30b can be used to deliver fluid to each manifold 38a/38b. If one of the registers 34a/34b stops working, at least temporarily the other of the registers 34a/34b can be used. The network 60 therefore enables the station 20 to continue to operate if a pump or register fails.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A distribution station comprising:
   a mobile trailer;
   first and second manifolds on the mobile trailer;
   first and second pumps on the mobile trailer;
   an adjustable feed network connecting the first and second pumps with the first and the second manifolds and including first and second registers for metering fluid, the adjustable feed network being switchable between first and second configurations, wherein
      in the first configuration the first pump is fluidly connected with the first manifold and fluidly disconnected from the second manifold, the first register is fluidly connected with the first pump and the first manifold, and the second register is fluidly connected with the second pump and the second manifold, and concurrently the second pump is fluidly connected to the second manifold and is fluidly disconnected from the first manifold, and
      in the second configuration the first pump is fluidly connected with the second manifold and fluidly disconnected from the first manifold, the second pump is fluidly disconnected from the first and second manifolds, and the first pump is fluidly connected with the second register and fluidly disconnected from the first register;
   a plurality of reels on the mobile trailer, each of said reels individually connected with the first or second manifold;
   a plurality of hoses, each of said hoses connected with a different one of the reels;
   a plurality of valves on the mobile trailer, each of said valves situated between the first or second manifold and a respective different one of the reels;
   a plurality of fluid level sensors, each of said fluid level sensors connectable to an end of a different one of the hoses; and
   a controller configured to individually open and close the valves responsive to the fluid level sensors.

2. The distribution station as recited in claim 1, wherein the adjustable feed network is further switchable between a third configuration in which the second pump is fluidly connected with the first register and the first manifold and fluidly disconnected from the second register and the second manifold, and the first pump is fluidly disconnected from the first and second manifolds and the first and second registers.

3. The distribution station as recited in claim 1, wherein the adjustable feed network is further switchable between a third configuration in which the second pump is fluidly connected with the first register and the first manifold and fluidly disconnected from the second register and the second manifold, and the first pump is fluidly disconnected from the first and second manifolds and the first and second registers.

4. The distribution station as recited in claim 1, wherein the adjustable feed network is further switchable between a third configuration in which the second pump is fluidly connected with the first register and the first manifold and fluidly disconnected from the second register and the second manifold, and the first pump is fluidly disconnected from the first and second manifolds and the first and second registers.

5. The distribution station as recited in claim 1, wherein the first and second registers are in communication with the controller.

6. The distribution station as recited in claim 1, wherein the first and second registers are electronic registers.

* * * * *